United States Patent Office 2,897,479
Patented July 28, 1959

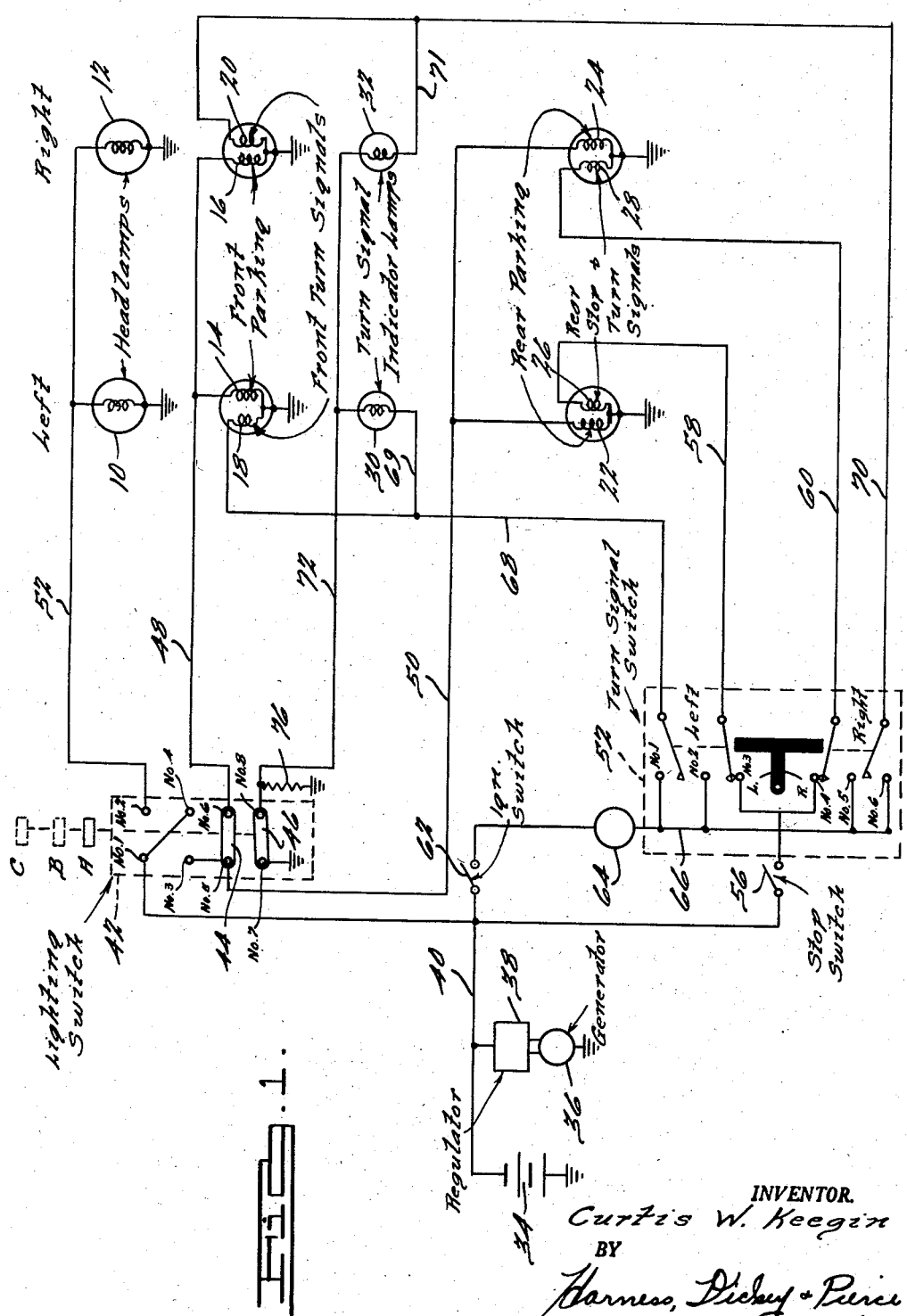

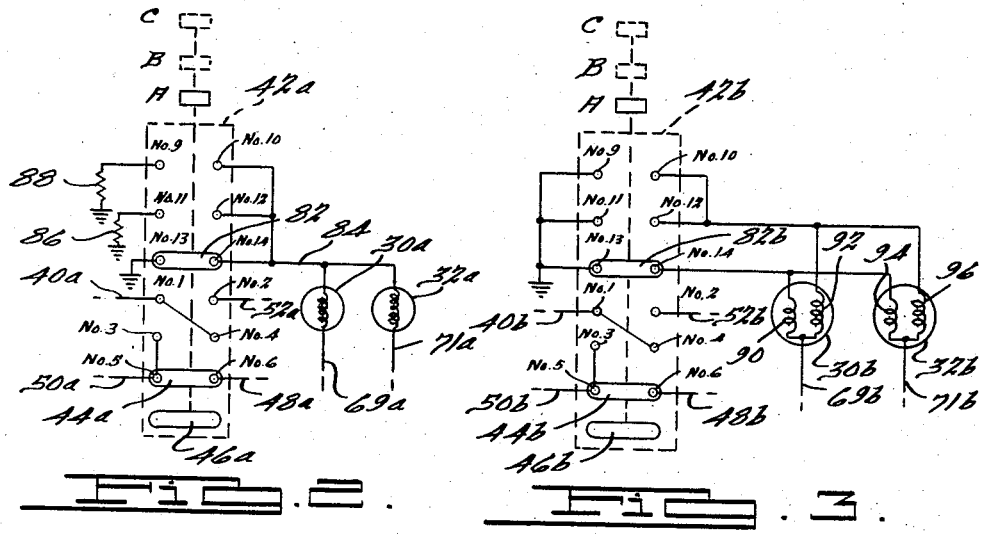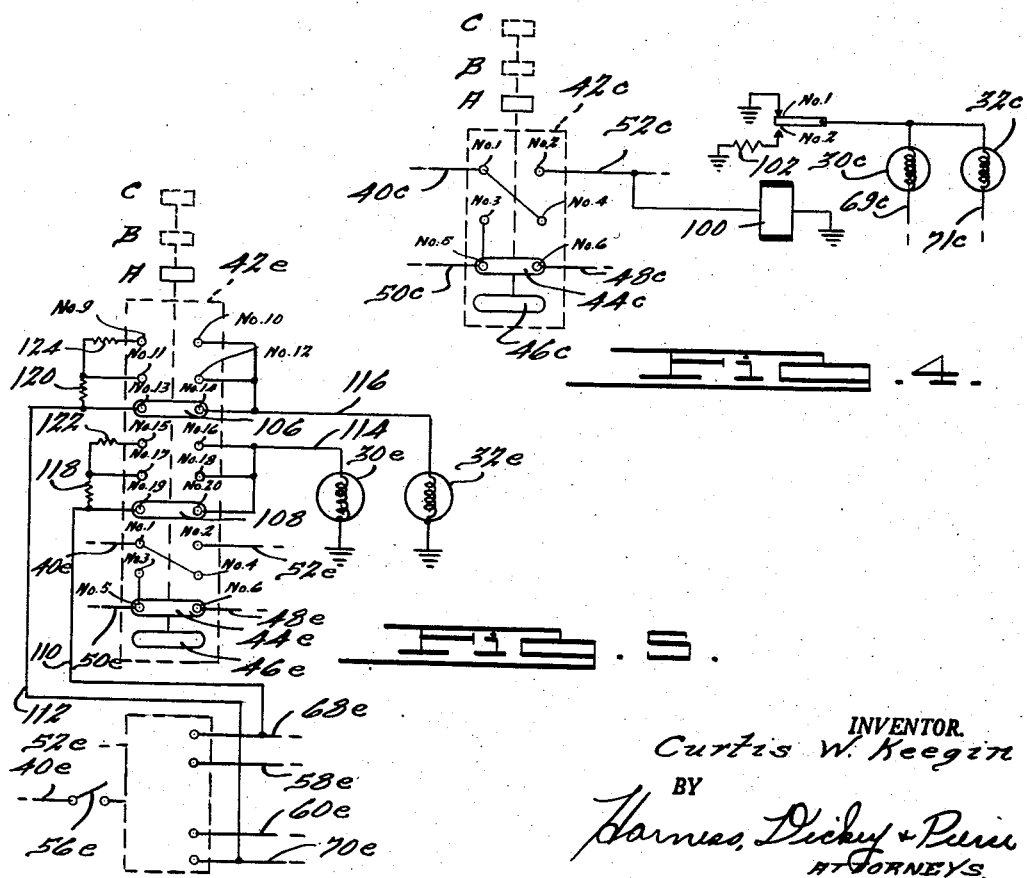

2,897,479

VEHICULAR SIGNAL SYSTEM

Curtis W. Keegin, Grosse Pointe, Mich.

Application July 18, 1955, Serial No. 522,552

4 Claims. (Cl. 340—74)

This invention relates to vehicular signal systems and more patricularly to indicator-lamp circuits in automotive electrical systems.

The principles of the invention are exemplarily embodied in a system for controlling the intensity of illumination of an indicator-lamp as a step function of the ambient illumination level. It is customary in existing turn-signal indicator circuits to provide upon the instrument panel means for producing a visible signal when the turn-signal switch is actuated. This means may comprise a single indicator-lamp which is periodically flashed to apprise the operator that he is signaling a turn or may comprise a pair of lamps each of which is individual to one of the two directions of turn. In the designing of such systems, the selection of the intensity level of the indicator lamps has been based upon a compromise between an intensity level sufficiently high to be readily apparent during the daytime and yet not so high as to be unduly distracting during nighttime driving. In accordance with the principles of the present invention means including the main headlight switch of the automobile are employed to vary the intensity of illumination of these indicator lamps.

The nature of the invention, and its objects and features, will be perceived from a consideration of the following detailed description of embodiments of the invention when read with reference to the accompanying drawings in which:

Figure 1 is a schematic representation showing the pertinent elements, and their interconnection, of a suitable turn-signal system including modifications embodying the principles of the present invention, employing return-side switching between two intensity levels of single-filament indicator lamps;

Fig. 2 is a partial schematic representation of a modified form of the invention represented in Fig. 1, employing return-side switching between three intensity levels of single-filament lamps;

Fig. 3 is a partial schematic representation of a further modification of the arrangement of Fig. 1 showing return-side switching between two intensity levels of dual-filament indicator lamps;

Fig. 4 is a partial schematic representation of a modification of the system of Fig. 1 in which a relay is employed to obtain two-step modification of the intensity of single-filament indicator lamps; and Fig. 5 is a schematic representation of the pertinent portions of a turn-signal system in which single-filament indicator lamps are switched between three discrete intensity levels, the switching being done on the hot or voltage side of the indicator lamp.

Referring to the embodiment of the invention represented in Fig. 1 of the drawings which includes the pertinent portions of an appropriate and conventional automotive electrical system. Thus, the automobile is assumed to be provided with a left headlamp 10 and a right headlamp 12 each of which is shown, for clarity, to have but one filament, and a pair of dual-filament lamps mounted on the forward exterior of the automobile including left-front parking filament 14, right-front parking filament 16, left-front turn signal filament 18 and right-front turn signal filament 20. At the rear exterior of the vehicle, two dual-filament lamps are provided including left-rear parking filament 22, right-rear parking filament 24, left-rear turn and stop filament 26 and right-rear turn and stop filament 28.

It is the practice in some automobiles to employ a single indicator-lamp for signaling the fact that the turn-signal lamps are energized, while in other cases two such indicator lamps are provided. In the disclosed arrangement, two signal indicator lamps 30 and 32 are shown but it will be appreciated that their number may be reduced, if desired, to one, with a consequent reduction in the complexity of certain portions of the circuity.

Each of the mentioned lamps is energized from a conventional voltage source system including a battery 34, a generator 36 and a generator regulator 38 whereby a direct voltage of an appropriate amplitude is applied to conductor 40.

In accordance with the conventional practice, the voltage on conductor 40 may be selectively applied to the headlamps 10 and 12, to the front parking filaments 14 and 16, and to the rear parking filaments 22 and 24 by a lighting switch 42 which, for that purpose, includes contacts Nos. 1 to 6 and movable elements 44 and 46. Contacts Nos. 1 and 4 are connected to conductor 40 and contacts 3 and 5 are interjoined.

Lighting switch 42 is a three-position switch having a position A, as shown, in which the headlamps and the front and rear parking lamps are off, a B position in which the front and rear parking lamps are energized, and a C position in which the headlamps and the rear parking or tail lights are energized. Thus, in the A position, as shown, neither of the Nos. 1 and 4 contacts is connected to any other contact and hence no one of the lamps controlled primarily by the lighting switch is energized. In the B position of the lighting switch 42, movable element 46 assumes the position presently occupied by movable element 44, and movable element 44 moves upwards to bridge between the Nos. 3 and 4 contacts. As a result, the voltage on conductor 40 is applied through the No. 4 contact of switch 42, movable element 44, No. 3 contact, No. 5 contact, movable element 46, No. 6 contact, conductor 48 to the front parking filaments 14 and 16, the other terminals of which are grounded. Similarly, the voltage appearing at contact No. 5 is applied via conductor 50 to the rear parking and tail lamp filaments 22 and 24, the other terminals of which are grounded.

In the third or C position of lighting switch 42, movable element 44 bridges between contacts Nos. 1 and 2, and movable element 46 bridges between contacts Nos. 3 and 4. Hence, the front parking filaments 14 and 16 are de-energized, but the rear parking or tail light filaments 22 and 24 remain energized. Additionally, with movable element 44 bridging the Nos. 1 and 2 contacts of switch 42, the voltage on conductor 40 is applied to conductor 52 to energize head lamps 10 and 12, the other end of the filaments of which are grounded.

The turn signal switch 52, which is conventional in design, comprises six contacts of which Nos. 3 and 4 are normally closed and Nos. 1, 2, 5 and 6 are normally open. The normal condition of these several contacts may be selectively modified by means of a lever actuated operating member 54 pivotal in either of two directions, it being assumed that member 54 is pivoted in a clockwise direction to signal a right turn and in a counterclockwise direction to signal a left turn. All of the contact springs are spring-biased to the shown position. When the operating member 54 is rotated in a counterclockwise direction, contacts Nos. 1 and 2 are closed and contact No. 3 is opened with the remainder of the contacts remaining in their normal position. Conversely, when the operating member 54 is rotated in a clockwise direction, contacts Nos. 5 and 6 are closed and contact No. 4 is opened, with contacts Nos. 1 to 3 remaining in their normal position.

With operating member 54 in its shown, normal, neutral position, the voltage on conductor 40 may be applied through the stop lamp switch 56 operated by the brake pedal, through the Nos. 3 and 4 contacts of switch 52, to conductors 58 and 60 to energize the stop lamp filaments 26 and 28.

In order that a flashing turn indication may be obtained, contacts Nos. 1, 2, 5 and 6 of turn-signal switch 52 are connected to the voltage on conductor 40 through the ignition switch 62 and a turn signal flasher 64 which may be an interrupter of any appropriate type such as those conventionally used for the purpose on the commercial market.

If a left turn is being signalled, in which case the No. 2 contact of switch 52 is closed, the periodically interruptable voltage on conductor 66 is applied via conductor 58 to the left rear turn-signal filament 26, and conversely, if a right turn is being signalled, the pulsating voltage on conductor 66 is applied through the No. 5 contact of switch 52 and via conductor 60 to the right turn signal filament 28. Additionally, when a left turn is signalled, the pulsating voltage on conductor 66 is applied through the No. 1 contact of switch 52 and via conductor 68 to the left front turn-signal 18. Similarly, when a right turn is being signalled, the pulsating voltage on conductor 66 is applied through the No. 6 contact of switch 52 and via conductor 70 to the right front turn-signal filament 20.

The turn-signal indicator lamps 30 and 32, mounted interiorly of the vehicle, are energized from conductors 68 and 70, respectively, via the branches 69 and 71 thereof, respectively. The other terminals of lamps 30 and 32 are both connected to conductor 72 and hence are connected directly to ground through the Nos. 7 and 8 contacts of lighting switch 42 and the movable element 46 if the lighting switch 42 is in its shown A position. Hence, the energized one of the turn signal indicator lamps 30 and 32 will produce illumination varying at a preselected rate, determined by flasher 64, between zero and full intensity.

If, however, lighting switch 42 is moved to either its B or C positions, such as it would be in evening or night driving, contacts Nos. 7 and 8 of lighting switch 42 are no longer bridged so that the return for indicator lamps 30 and 32 is to ground via conductor 72 and resistor 76. Hence, the current flow through the energized one of these lamps is reduced so that it produces illumination which varies at the aforesaid preselected rate between zero and a finite value less than its maximum intensity.

Thus, during daytime driving, in which lighting switch 42 is in its A position, indicator lamp 30 or 32, when energized, glows with maximum intensity and hence is readily viewable and commands attention despite the high ambient light level, while during evening or night driving, the intensity of illumination produced by lamp 30 or 32 is at a lower value capable of attracting attention and yet not being unduly distracting.

It may be desirable to change the level of illumination produced by the indicator lamps 30 and 32 between any one of two finite values of intensity so that they will be brightest during the day, least bright during the night and at an intermediate value during the evening hours. This may be accomplished by modifying the lighting switch 42 in accordance with the representation of Fig. 2 of the drawings. In this representation, as well as in the other figures, only the changed portions of the circuits are disclosed and the cooperative nature of the shown portions with the remainder of the circuit of Fig. 1 may be readily perceived by the correspondence of reference numerals, distinguishing suffixes being applied in each different figure of the drawings.

In the arrangement of Fig. 2, two-step return-side switching is achieved by adding a movable element 82 and contacts Nos. 9 to 14 to the lighting switch 42a. In the A position of the switch 42a, as shown, the return conductor 84 of the indicator lamps 30a and 32a is connected to ground since the Nos. 13 and 14 contacts are bridged by movable element 82. In the B position of switch 42a, conductor 84 is connected to ground through the No. 12 contact of switch 42a, movable element 82, No. 11 contact of switch 42a, and relatively low-value resistor 86. In the C position of switch 42a, contacts Nos. 9 and 10 are bridged by movable elements 82 and hence the return for lamps 30a and 32a is through higher-value resistor 88 to produce a further reduction in the intensity level of illumination produced by the indicator lamps under nighttime driving conditions.

As is represented in Fig. 3 of the drawings, two-step operation may be achieved by the use of dual-filament indicator lamps 30b and 32b if desired. Thus, lamp 30b is provided with a bright filament 90 and a dim filament 92 and lamp 32b is provided with a bright filament 94 and a dim filament 96. In the A position of switch 42b, the bright filaments 90 and 94 are connected to ground through the Nos. 13 and 14 contacts and movable element 82b of switch 42b. In the B and C positions of switch 42b, it is the dim filaments 92 and 96 which are connected to ground. It will be appreciated that if a resistor is inserted between ground and the No. 9 contact of switch 42b, three-step operation may be achieved if desired.

In the arrangement of Fig. 4, a relay 100 is employed and as a consequence the lighting switch 42c need be provided with only its Nos. 1 to 6 contacts. When relay 100 is de-energized, as shown, both indicator lamps 30c and 32c are returned to ground through the No. 1 normally closed contact of that relay. Conductor 52c, which is connected to the headlamps 10 and 12 (Fig. 1), is supplied with voltage only when the lighting switch 42c (Fig. 4) is in its C position. When this occurs, relay 100 operates to open its No. 1 contact and to close its No. 2 contact, whereupon the return for lamps 30c and 32c is through resistor 102 so that their intensity of illumination is reduced when the headlamps are on.

Among other apparent modifications of the circuit of Fig. 4, it will be noted that dual-filament lamps may be employed, with the bright filaments of both lamps being connected to ground through the armature or swinger of relay 100 when that relay is deenergized and with the dim filaments of both lamps being connected to ground when that relay is energized.

In Fig. 5, the arrangement of Fig. 1 has been modified to demonstrate three-step operation of single filament bulbs with the switching occurring in the input-voltage leads of the indicator lamps 30e and 32e. The circuit of Fig. 5 is intended to be identical to that of Fig. 1 except for the depicted changes in the lighting switch 42e and the different association of the lamps 30e and 32e with that lighting switch. Two additional movable elements 106 and 108 are provided on the lighting switch 42e as are six additional pairs of contacts engageable by those movable elements. Since it is the voltage side of the circuits which is switched, the indicator lamps 30e and 32e may be and preferably are mounted in conventional grounded sockets so that, as shown, the lower terminals of their filaments are directly connected to ground, as represented by the body of the vehicle.

In this arrangement, a pair of branch conductors 110 and 112 are extended from conductors 68e and 70e, respectively, to the lighting switch 42e. When lighting switch 42e is in its shown A position, any pulsating voltage appearing on conductor 68e, indicative of a left-turn signal, is applied via conductor 110, Nos. 19 and 20 contacts of switch 42e, now bridged by movable element 108, conductor 114 and to the left indicator-lamp 30e. Similarly, a pulsating voltage appearing on conductor 70e is applied via conductor 112, the Nos. 13 and 14 contacts of switch 42e, bridged by movable element 106, conductor 116 to the filament of the right turn indicator-lamp 32e.

In the B position of switch 42e, movable element 108 is in bridging relationship to contacts Nos. 17 and 18 and movable element 106 is in bridging relationship to contacts Nos. 11 and 12. Hence, the energizing circuit for lamp 30e includes current limiting and voltage dropping resistor 118 and the circuit for lamp 32e now includes resistor 120.

In the C position of switch 42e both resistors 118 and 122 are included in the circuit of lamp 30e and both resistors 120 and 124 are serially included in the energizing circuit of lamp 32e.

It will be appreciated that the system of Fig. 5 may be readily modified to employ dual-filament indicator lamps 30e and 32e if desired. Thus, if but single step operation is required, for example, contacts Nos. 9, 11 and 13 may be connected directly to conductor 112 and contacts 15, 17 and 19 may be conducted to conductor 110, with contact No. 14 being connected to the high-intensity filament of lamp 32e, contact No. 20 being connected to the high-intensity filament of lamp 30e, with contacts Nos. 10 and 12 being connected to the low-intensity filament of lamp 32e and with contacts Nos. 16 and 18 being connected to the low-intensity filament of lamp 30e. Other modifications will be apparent to those skilled in the art, such as the provision of two-step operation if that be desired.

It will further be appreciated that a relay may be employed in switching the hot side of the circuits of the indicator lamps in a similar manner to that in which the relay 100 was employed in Fig. 4 of the drawings to switch the return-side of the lamps. Thus, the upper terminals of lamps 30 and 32 in Fig. 1 of the drawings may be connected directly to ground, with conductor 72 and the Nos. 7 and 8 contacts of lighting switch 42 being eliminated, a voltage dropping and current limiting resistor may be inserted in each of the conductors 69 and 71 and these resistors may be shunted by a normally closed contact of a relay such as relay 100, the winding of which is connected as shown in Fig. 4 of the drawings. Alternatively, such a relay may be employed to switch the voltage source between the bright and dim filaments of dual-filament bulbs if desired.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In an automobile electrical system, a source of voltage, a headlamp, an auxiliary lamp, a switch having a first position in which said source is connected to said headlamp, a second position in which said source is connected to said auxiliary lamp, and a third position in which said source is disconnected from both of said lamps, an indicator-lamp, means including said switch in its first position for causing said indicator-lamp to emit light of a first vsible intensity, means including said switch in its second position for causing said indicator-lamp to emit lght of a higher intensity, and means including said switch in its third position for causing said indicator lamp to emit light of a still higher intensity.

2. In an automobile electrical system, a source of voltage, a headlamp, a switch having a headlamp first position in which said headlamp is connected to said source and a second position in which said headlamp is disconnected from said source, a turn signal lamp exterior of the automobile; a turn-signal indicator-lamp interior of the automobile for indicating the condition of said signal lamp, a turn-signal switch, means including said turn-signal switch effective in both positions of said headlamp switch for causing said signal lamp to emit light of a preselected intensity, means including said turn-signal switch effective when said headlamp switch is in its first position for causing said indicator lamp to emit light of a preselected visible intensity, and means including said turn-signal switch effective when said headlamp switch is in its second position for causing said indicator-lamp to emit light of a higher intensity.

3. In an automobile electrical system, a source of voltage, a headlamp, an auxiliary lamp, a main switch having a first position in which said source is connected to said headlamp, a second position in which said source is connected to said auxiliary lamp, and a third position in which said source is disconnected from both of said lamps, a turn-signal indicator-lamp, a turn-signal switch, means including said turn-signal switch effective when said main switch is in its first position for causing said indicator lamp to emit light a preselected visible intensity, means including said turn-signal switch effective when said main switch is in its second position for causing said indicator lamp to emit light of a higher intensty, and means including said turn-signal switch effective when said main switch is in its third position for causing said indicator-lamp to emit light of a still higher intensity.

4. The combination of claim 2 in which means including a flasher is provided for repetitively flashing said signal lamp between zero intensity and said preselected intensity under the control of said turn-signal switch in both positions of said headlamp switch, for repetitively flashing said indicator lamp between zero intensity and said preselected visible intensity under the control of said turn-signal switch and when said headlamp switch is in said first position, and for repetitively flashing said indicator lamp between zero intensity and said higher intensity under the control of said turn-signal switch and when said headlamp switch is in said second position.

References Cited in the file of this patent

UNITED STATES PATENTS

| | | |
|---|---|---|
| 1,871,877 | Buckman | Aug. 16, 1932 |
| 2,179,252 | Douglas | Nov. 7, 1939 |
| 2,179,686 | Cohen | Nov. 14, 1939 |
| 2,339,687 | Doane | Jan. 18, 1944 |
| 2,648,059 | Hostetler | Aug. 4, 1953 |
| 2,731,584 | Onksen | Jan. 17, 1956 |